US006267458B1

(12) United States Patent
Hansen et al.

(10) Patent No.: US 6,267,458 B1
(45) Date of Patent: Jul. 31, 2001

(54) APPARATUS FOR PROTECTING A TRACK ASSEMBLY OF A TRACTOR

(75) Inventors: Gary W. Hansen, Sycamore; Lynn A. Sutton, Kewanee; Michael B. Miller, Rockford, all of IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/456,749

(22) Filed: Dec. 8, 1999

(51) Int. Cl.$^7$ .......................... B62D 25/16; B60R 19/02; B60R 19/56
(52) U.S. Cl. ........................ 305/107; 305/100; 305/108; 305/109; 293/102
(58) Field of Search .................. 305/100, 107 I, 305/108, 109, 110, 116; 293/102, 1; 280/855, 856

(56) References Cited

U.S. PATENT DOCUMENTS

| | | |
|---|---|---|
| 1,158,114 | 10/1915 | Best . |
| 1,387,086 | * 8/1921 | White ................................. 305/109 |
| 1,647,540 | * 11/1927 | Rasmussen ......................... 305/109 |
| 1,741,878 | 12/1929 | Rasmussen . |
| 1,992,702 | 2/1935 | Koop . |
| 2,531,111 | * 11/1950 | Daniels ............................... 305/109 |
| 2,780,500 | 2/1957 | Lawson . |
| 2,900,210 | 8/1959 | Parsons . |
| 2,982,584 | 5/1961 | Uemura . |
| 3,394,969 | 7/1968 | Hudis . |
| 3,861,762 | 1/1975 | Freedy et al. . |
| 4,082,371 | * 4/1978 | Werner et al. ....................... 305/109 |
| 4,134,622 | * 1/1979 | Krolak et al. ....................... 305/110 |
| 4,198,103 | * 4/1980 | Ward et al. .......................... 305/110 |
| 4,229,053 | * 10/1980 | Cline ................................... 305/109 |
| 4,235,479 | * 11/1980 | Puglise ................................ 305/107 |
| 4,553,790 | 11/1985 | Boggs . |
| 4,763,961 | 8/1988 | Parrott . |
| 5,873,424 | 2/1999 | Gustafson et al. . |

FOREIGN PATENT DOCUMENTS

WO 83/01045    3/1983  (WO) .

* cited by examiner

*Primary Examiner*—S. Joseph Morano
*Assistant Examiner*—Jason R. Bellinger
(74) *Attorney, Agent, or Firm*—Maginot, Addison & Moore; Jeff A. Greene

(57) ABSTRACT

A tractor includes a track assembly having a frame, an idler wheel mechanically coupled to the frame, a drive wheel mechanically coupled to the frame, an endless track disposed around the idler wheel and the drive wheel, and a number of mid-rollers interposed between the idler wheel and the drive wheel. The tractor also includes a first protection member having a first upper edge and a first lower edge. The first protection member is secured to the frame such that a portion of the frame is positioned behind the first protection member. The tractor further includes a number of first guard members secured to the first protection member so that (i) the first guard members extend downwardly beyond the first lower edge toward the endless track and (ii) the first guard members are spaced apart from each other along the first lower edge such that a gap is defined between adjacent first guard members.

15 Claims, 4 Drawing Sheets

APPARATUS FOR PROTECTING A TRACK ASSEMBLY OF A TRACTOR

BACKGROUND OF THE INVENTION

The present invention relates generally to a track assembly, and more particularly to an apparatus for protecting a track assembly of a tractor.

Many agricultural crops are planted in a field to form crop rows. These types of crops typically require some form of weed control in order to optimize their yield. Cultivation is one method utilized to destroy weeds and loosen soil in the field in which the crop is growing.

A cultivator is one agricultural implement used to cultivate a crop field. In general, a cultivator includes a number of teeth or hoes for engaging the soil. The teeth or hoes break up the surface of the soil and uproot unwanted weeds as a tractor pulls the cultivator across the crop field. The teeth or hoes of the cultivator are positioned such that they only engage the soil between crop rows, and thus do not disturb the crops.

A track-laying tractor can be used to pull the cultivator across the crop field. Track-laying tractors (hereinafter referred to as a "tractor") can have track assemblies that include an endless rubber track which forms a loop around a drive wheel, a number of mid-rollers, and an idler wheel. During use of the tractor, the drive wheel rotates and engages the rubber track thereby causing the rubber track to rotate around a path defined by the drive wheel and the idler wheel. The rotation of the rubber track causes it to engage the ground, thereby propelling the tractor and the coupled cultivator over the ground to cultivate the crop field.

The above described arrangement results in the track assemblies having a number of "pinch points" between the drive wheel and the rubber track, and also between the mid-rollers and the rubber track. These pinch points cause various problems. For example, as the tractor moves between crop rows during cultivation, plant matter, such as leaves, or other material in the vicinity of the track assembly becomes trapped in the pinch points. As a result, the trapped leaves are torn away from the agricultural plants, which causes damage to the crop. Another problem with these pinch points is that soil, rocks, and plant debris becomes trapped between the rubber track and the drive wheel. The trapped material is released when the drive wheel and the rubber track separate at the top of the drive wheel. The material then drops free onto the mid-rollers and is recycled through the track assembly again. This material causes damage to the rubber track and other undercarriage components. Failing to remove the lodged matter from the track assembly reduces component life, thus increasing the tractor maintenance cost.

It would therefore be desirable to provide an apparatus for protecting a track assembly of a tractor that substantially prevents material from being trapped in pinch points of the track assembly. It would also be desirable to provide an apparatus for protecting a track assembly of a tractor that substantially prevents material from being lodged between the rubber track and the drive wheel, and between the rubber track and the mid-rollers of the track assembly. It would also be desirable to provide an apparatus for protecting a track assembly of a tractor that substantially prevents the track assembly from damaging plants in the vicinity thereof. It would further be desirable to provide an apparatus for protecting a track assembly of a tractor that reduces the maintenance cost of the tractor.

SUMMARY OF THE INVENTION

In accordance with one embodiment of the present invention there is provided an apparatus for protecting a track assembly of a tractor. The track assembly has a frame, an idler wheel mechanically coupled to the frame, a drive wheel mechanically is coupled to the frame, an endless track disposed around the idler wheel and the drive wheel, and a number of mid-rollers interposed between the idler wheel and the drive wheel. The apparatus includes a first protection member having a first upper edge and a first lower edge. The first protection member is securable to the frame such that a portion of the frame is positioned behind the first protection member. The assembly also includes a number of first guard members secured to the first protection member so that (i) the first guard members extend downwardly beyond the first lower edge toward the endless track and (ii) the first guard members are spaced apart from each other along the first lower edge such that a gap is defined between adjacent first guard members.

In accordance with another embodiment of the present invention there is provided an apparatus for protecting a track assembly of a tractor. The track assembly has a frame, an idler wheel mechanically coupled to the frame, a drive wheel mechanically coupled to the frame, an endless track disposed around the idler wheel and the drive wheel, and a number of mid-rollers interposed between the idler wheel and the drive wheel. The apparatus includes a first protection member having a first upper edge and a first lower edge. The first protection member is securable to the frame such that a portion of the frame is positioned behind the first protection member. The apparatus also includes a number of first guard members secured to the first protection member so that (i) the first guard members extend downwardly beyond the lower edge toward the endless track and (ii) the first guard members are spaced apart from each other along the first lower edge such that a gap is defined between adjacent first guard members. The apparatus further includes a second protection member having a second upper edge and a second lower edge. The second protection member is securable to the frame such that a portion of the frame is interposed between the first protection member and the second protection member. The apparatus also includes a number of second guard members secured to the second protection member so that (i) the second guard members extend downwardly beyond the second lower edge toward the endless track and (ii) the second guard members are spaced apart from each other along the second lower edge such that a gap is defined between adjacent second guard members. The first guard members and the second guard members are made from a resilient substance.

In accordance with yet another embodiment of the present invention there is provided a tractor. The tractor includes a track assembly having a frame, an idler wheel mechanically coupled to the frame, a drive wheel mechanically coupled to the frame, an endless track disposed around the idler wheel and the drive wheel, and a number of mid-rollers interposed between the idler wheel and the drive wheel. The tractor also includes a first protection member having a first upper edge and a first lower edge. The first protection member is secured to the frame such that a portion of the frame is positioned behind the first protection member. The tractor further includes a number of first guard members secured to the first protection member so that (i) the first guard members extend downwardly beyond the first lower edge toward the endless track and (ii) the first guard members are spaced apart from each other along the first lower edge such that a gap is defined between adjacent first guard members.

DETAILED DESCRIPTION OF THE PREFERRED EMBODIMENT

Figure 1:
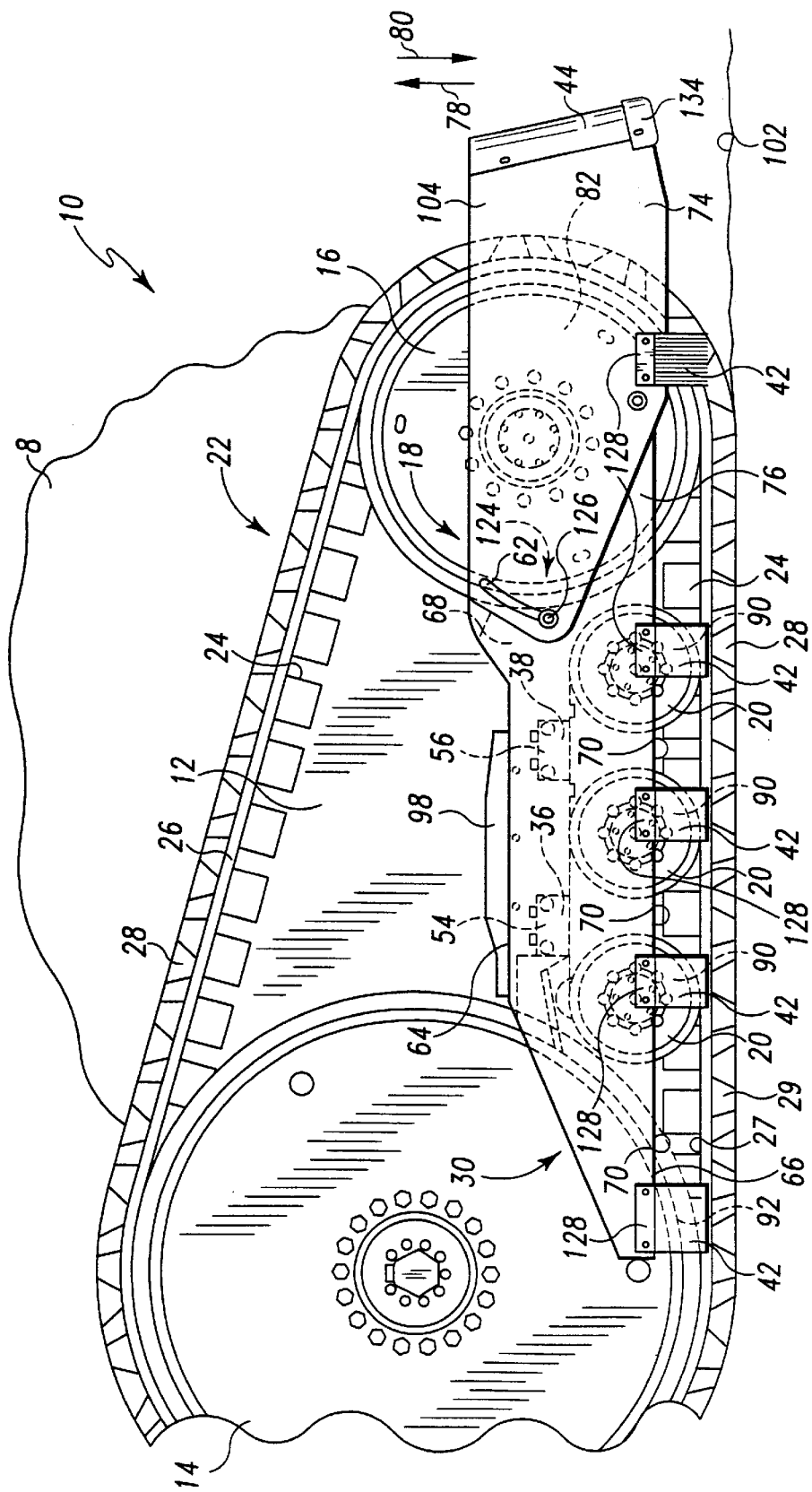
FIG. 1 is a side fragmentary view of a tractor which incorporates the features of the present invention therein (note that a portion of the track assembly of the tractor is shown in phantom for clarity of description)

While the invention is susceptible to various modifications and alternative forms, a specific embodiment thereof has been shown by way of example in the drawings and will herein be described in detail. It should be understood, however, that there is no intent to limit the invention to the particular form disclosed, but on the contrary, the intention is to cover all modifications, equivalents, and alternatives falling within the spirit and scope of the invention as defined by the appended claims.

Figure 2:
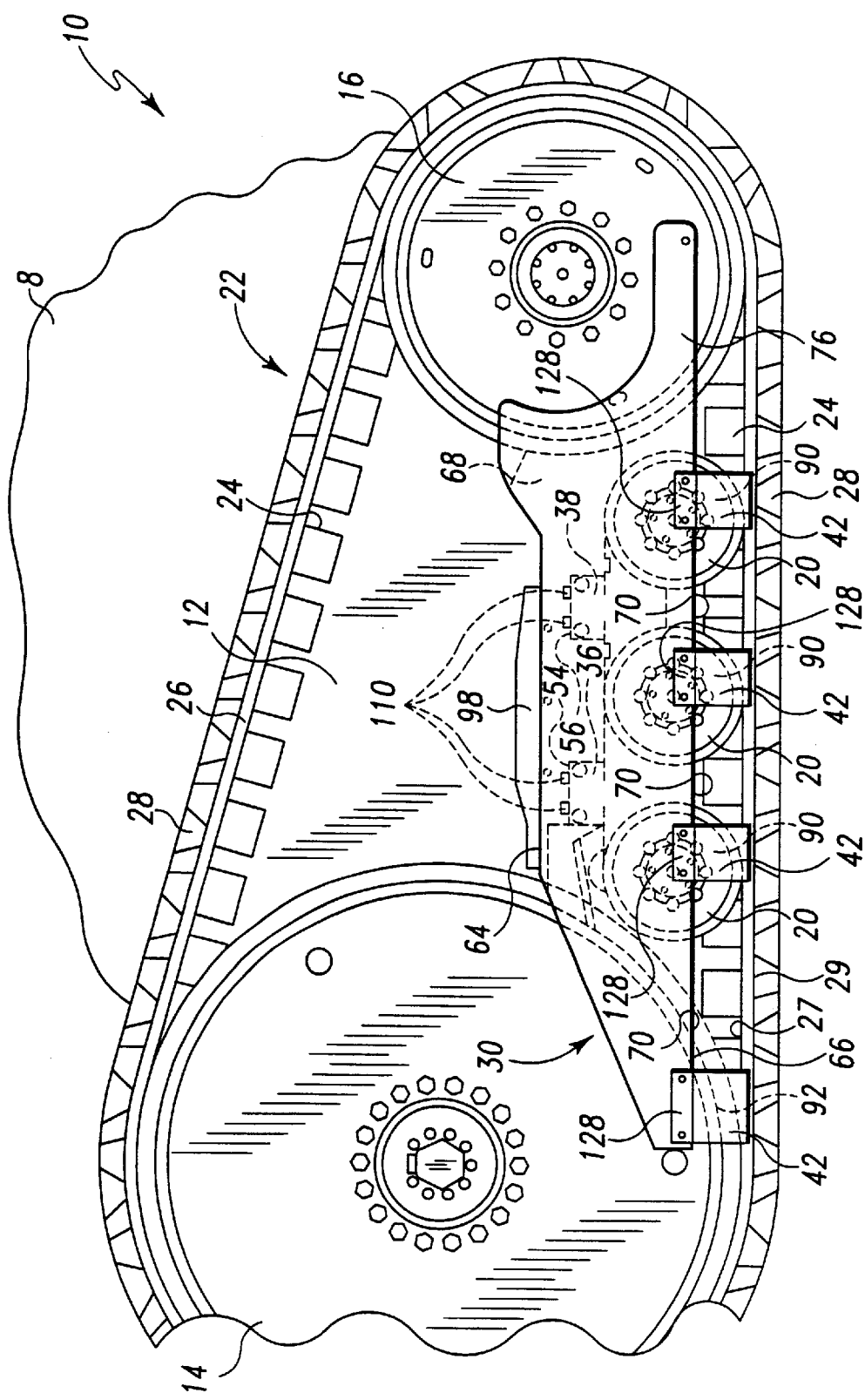
FIG. 2 is a view similar to FIG. 1, but showing an end shield member removed from a first protection member.
Figure 3:
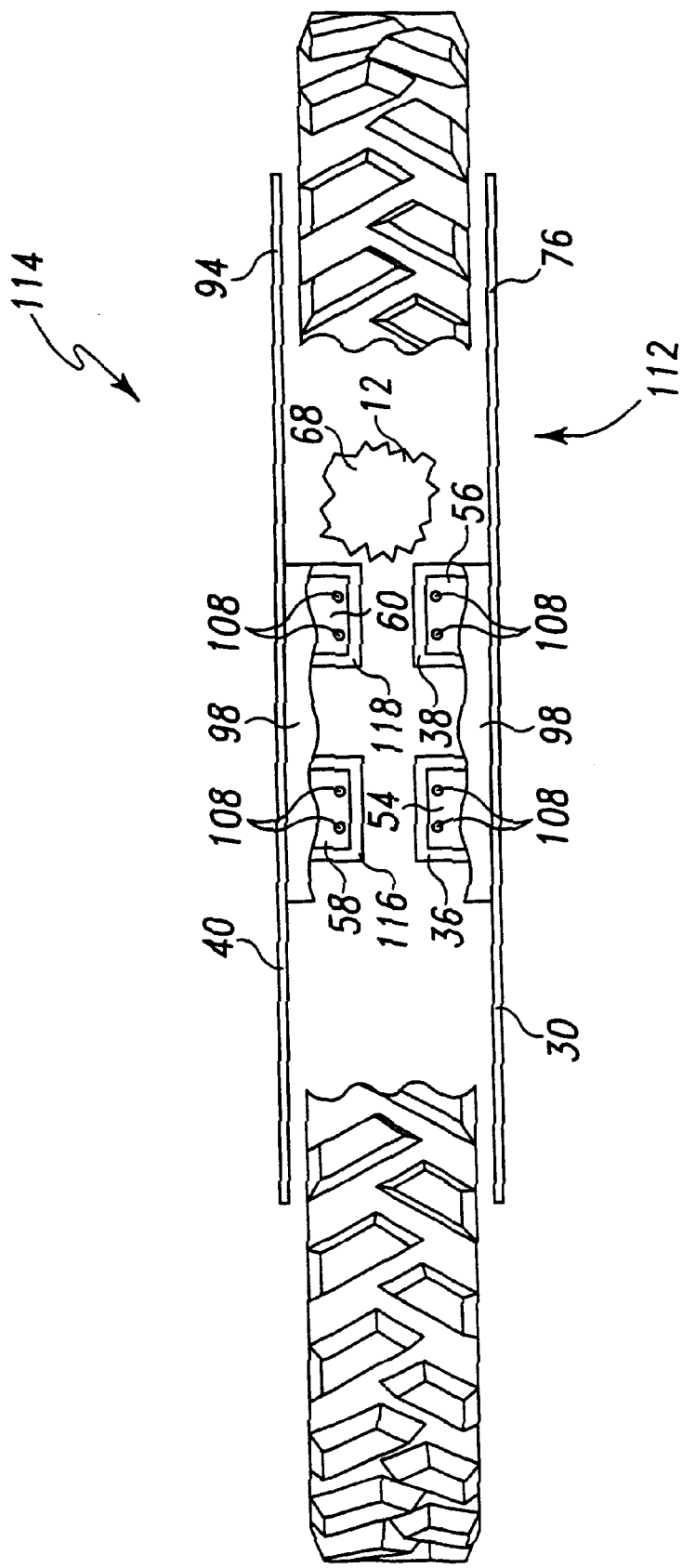
FIG. 3 is a top elevational view of the first protection member and a second protection member showing an endless track interposed therebetween and a fragmentary view of deflector plates.

Referring to FIGS. 1 and 3, there is shown a track assembly 10 of a tractor 8 (note that only a fragment of the tractor 8 is shown) that incorporates the features of the present invention therein. It should be appreciated that while only one track assembly is shown in FIGS. 1–5, tractor 8 has two track assemblies. The second track assembly of tractor 8 is substantially identical to, and functions in a substantially identical manner as, track assembly 10. Therefore, the following description of track assembly 10 is applicable to the second track assembly of tractor 8. As a result, a detailed description of the second track assembly of tractor 8 will not be provided herein.

Track assembly 10 includes a frame 12, a drive wheel 14, an idler wheel 16, and a number of mid-rollers 20. Track assembly 10 also includes a endless track 22 and frame members 36 and 38. As will be discussed in greater detail below, track assembly 10 also includes an apparatus 18 for protecting track assembly 10 of tractor 8.

Drive wheel 14 and idler wheel 16 are rotatably secured to frame 12. Each mid-roller 20 is also rotatably attached to frame 12.

Endless track 22 includes a carcass 26 having an inner surface 27 and an outer surface 29. Inner surface 27 has a number of guide blocks 24 extending therefrom. Outer surface 29 has a number of lugs 28 extending therefrom. Endless track 22 forms a loop around drive wheel 14, idler wheel 16 and mid-rollers 20. During use of tractor 8, drive wheel 14 rotates and engages endless track 22 thereby causing endless track 22 to rotate around a path defined by drive wheel 14 and idler wheel 16. Guide blocks 24 aid in keeping endless track 22 entrained around drive wheel 14, idler wheel 16 and mid-rollers 20. Rotation of endless track 22 cause lugs 28 thereof to engage ground 102 (see FIG. 1) thereby propelling tractor 8 over ground 102 to perform various work functions.

Figure 4:
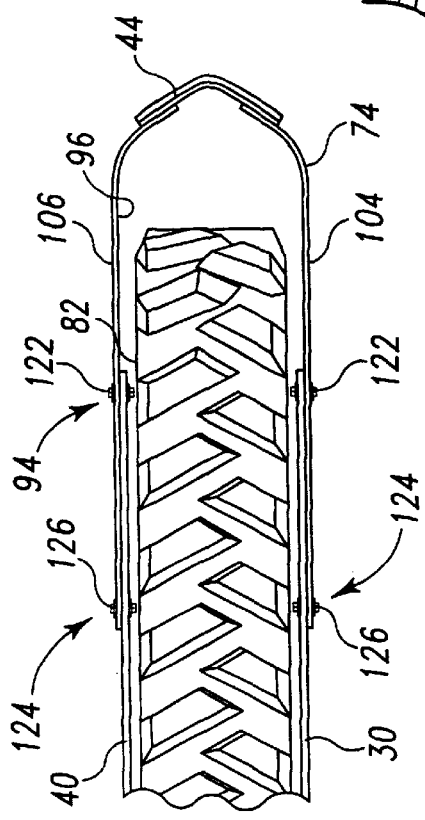
FIG. 4 is a fragmentary view similar to that shown in FIG. 3, but showing the end shield member secured to the first and second protection members.

As shown in FIGS. 1–5, apparatus 18 includes a protection member 30, a protection member 40, a pair of deflector plates 98, and a number of guard members 42. As shown more clearly in FIG. 3, apparatus 18 also includes attachment plates 54, 56, 58, and 60. Attachment plates 54 and 56 are secured to protection member 30 with a number of fasteners. Attachment plates 58 and 60 are attached to protection member 40 with a number of fasteners. As shown in FIG. 4, apparatus 18 further includes a skid plate 134, a nose piece 44, and an end shield member 74 having a first half 104 and a second half 106. Protection members 30 and 40, guard members 42, deflector plates 98, nose piece 44, and end shield member 74 can be made out of a resilient plastic material. What is meant herein by resilient plastic material is an elastic material which can spring back quickly into shape after being bent, stretched, or deformed. On the other hand, attachment plates 54, 56, 58, and 60 can be made from a metallic material.

As shown more clearly in FIGS. 2 and 3, protection member 30 is positioned adjacent to an outer side 112 of frame 12 so that apertures 108 defined in attachment plates 54 and 56 are aligned with apertures (not shown) defined in frame members 36 and 38. In particular, protection member 30 is positioned so that apertures 108 defined in attachment plate 54 are aligned with the apertures defined in frame member 36, while apertures 108 defined in attachment plate 56 are aligned with the apertures defined in frame member 38. Fasteners 110 (see FIG. 2) are then inserted through apertures 108 and the apertures defined in frame members 36 and 38 so as to secure protection member 30 to frame 12. It should be understood that securing protection member 30 to frame 12 in the above described manner results in a portion 68 of frame 12 being positioned behind protection member 30 as shown in FIGS. 1 and 2.

As shown in FIG. 3, protection member 40 is secured to frame 12 in a substantially identical manner as described above for protection member 30, with the exception that protection member 40 is positioned adjacent to an inner side 114 of frame 12 so that apertures 108 defined in attachment plates 58 and 60 are aligned with apertures (not shown) defined in frame members 116 and 118. Once protection member 40 is located in the aforementioned position, fasteners (not shown) which are substantially identical to fasteners 110 (see FIG. 2) are then inserted through apertures 108 and the apertures defined in frame members 116 and 118 so as to secure protection member 40 to frame 12. It should be understood that securing protection member 40 to frame 12 in the above described manner results in a portion 68 of frame 12 being interposed between protection member 30 and protection member 40 as shown in FIG. 3.

Deflector plate 98 is attached to protection member 30 so that deflector plate 98 extends toward frame 12 from an upper edge 64 of protection member 30. Positioning deflector plate 98 in the above described manner results in deflector plate 98 covering a portion of mid-rollers 20. The other deflector plate 98 is attached to protection member 40 in a substantially identical manner as described above for protection member 30.

Referring to FIGS. 1 and 2, guard members 42 are secured to protection member 30 with brackets 128 so that (i) guard members 42 extend downwardly beyond a lower edge 66 of guard member 30 toward endless track 22 and (ii) guard members 42 are spaced apart from each other along lower edge 66 of protection member 30 such that a gap 70 is defined between adjacent guard members 42. Guard members 42 are further secured to protection member 30 such that guard members 42 are positioned adjacent to mid-rollers 20 so that a portion 90 of each mid-roller 20 is located behind the adjacent guard member 42. Furthermore, a guard member 42 is positioned adjacent to drive wheel 14 so that a portion 92 of drive wheel 14 is located behind the adjacent guard member 42. Moreover, each guard member 42 is secured to protection member 30 so that a guard member 42 is positioned to cover or be slightly ahead of the pinch point defined between each mid-roller 20 and endless track 22. A guard member 42 is also secured to protection member 30 so that the guard member 42 is positioned to cover the pinch point defined between drive wheel 14 and endless track 22.

Figure 5:
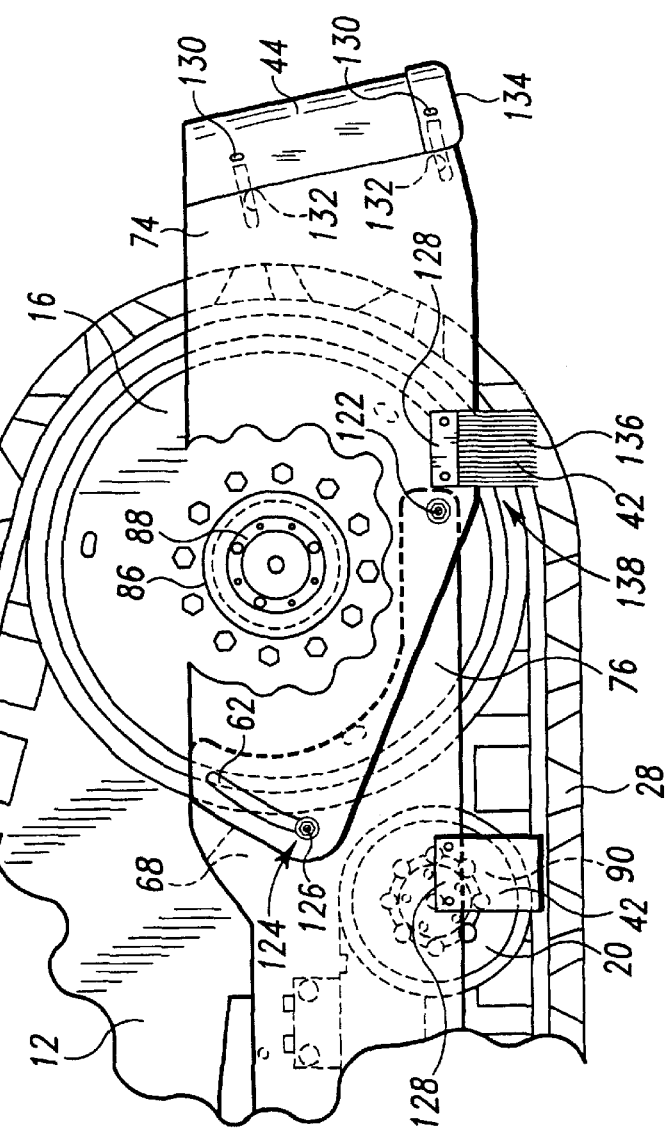
FIG. 5 is a fragmentary side elevational view of the end shield member pivotally secured to the first protection member and showing a thrust plate secured to the hub of the idler wheel.

In addition, as shown more clearly in FIG. 5, a guard member 42 is secured to end shield member 74 so that the guard member 42 is positioned on the outer side 112 (see FIG. 3) of frame 12 to cover the pinch point defined between ground 102 and endless track 22. The guard member 42 secured to end shield member 74 is positioned adjacent to idler wheel 16 so that a segment 138 (see FIG. 5) of idler wheel 16 is located behind the adjacent guard member 42.

It should also be appreciated that a number of guard members 42 are also secured to protection member 40 in a substantially identical manner as described above for protection member 30. Specifically, guard members 42 are secured to protection member 40 so that (i) guard members 42 extend downwardly beyond a lower edge (not shown) of guard member 40 toward endless track 22 and (ii) guard members 42 are spaced apart from each other along the lower edge of protection member 40 such that a gap substantially identical to gap 70 is defined between adjacent guard members 42. Guard members 42 are further secured to protection member 40 such that guard members 42 are positioned adjacent to mid-rollers 20 so that a portion 90 of each mid-roller 20 is located behind the adjacent guard member 42. Furthermore, a guard member 42 is positioned adjacent to drive wheel 14 so that a portion 92 of drive wheel 14 is located behind the adjacent guard member 42. Positioning and securing guard members 42 to protection member 30 and protection member 40 in the above described manner results in portion 92 of drive wheel 14 and portion 90 of each mid-roller 20 being interposed between the guard members 42 attached to protection member 30 and the guard members 42 attached to protection member 40.

In addition, a guard member 42 is secured to end shield member 74 so that the guard member 42 is positioned on the inner side 114 (see FIG. 3) of frame 12 to cover the pinch point defined between ground 102 and endless track 22. The guard member 42 secured to end shield member 74 on inner side 114 is positioned adjacent to idler wheel 16 so that a segment 138 (see FIG. 5) of idler wheel 16 is located behind the adjacent guard member 42. Positioning and securing the pair of guard members 42 to end shield member 74 in the above described manner results in segment 138 of idler wheel 16 being interposed between the guard members 42 attached to end shield member 74.

Note that brackets 128 can be made from extruded aluminum and configured so that each guard member 42 is slidably mounted within bracket 128 while bracket 128 is secured to protection members 30 and 40 or end shield member 74 with a number of fasteners. It should be appreciated that each guard member 42 can be made from a metal strip brush having a plurality of nylon bristles 136 (see FIG. 5) extending from bracket 128. Guard members 42, that include the bracket 128 and the bristles 136, which can be used in the present invention are available as part number 175-5443 and part number 175-5445 from Felton Brush Inc., located in London, N.H. Moreover, bristles 136 which can be used with brackets 128 are available as part numbers 180-5739 and 180-5740 from the Sealeze Company, located in Richmond, Va.

Referring now to FIGS. 1, 4, and 5, first half 104 of end shield member 74 is pivotally secured to an end portion 76 of protection member 30 with a fastener 122 so that first half 104 can pivot relative to protection member 30 in the directions indicated by arrows 78 and 80. Attaching first half 104 of end shield member 74 to protection member 30 in the above described manner results in a portion 82 of idler wheel 16 being located behind first half 104 of end shield member 74 (see FIG. 1).

Furthermore, an end portion 124 of first half 104 has a slot 62 defined therein. A fastener 126 is inserted through slot 62 and secured to protection member 30. Slot 62 and fastener 126 cooperate to limit the distance first half 104 of end shield member 74 can travel in the directions indicated by arrows 78 and 80.

As shown in FIG. 4, second half 106 of end shield member 74 is pivotally secured to protection member 40 in a substantially identical manner as described above for protection member 30. In particular, second half 106 is pivotally secured to an end portion 94 of protection member 40 with a fastener 122 so that second half 106 can pivot relative to protection member 40 in the directions indicated by arrows 78 and 80. As with first half 104, attaching second half 106 of end shield member 74 to protection member 40 in the above described manner results in portion 82 of idler wheel 16 being located behind second half 106 of end shield member 74.

Second half 106 also has a slot (not shown) defined therein substantially identical to slot 62. A fastener 126 is inserted through the slot and secured to protection member 40. As with first half 104, the slot defined in second half 106 and fastener 126 cooperate to limit the distance second half 106 of end shield member 74 can travel in the directions indicated by arrows 78 and 80.

As shown in FIG. 4, securing first half 104 and second half 106 of end shield member 74 to protection member 30 and protection member 40, respectively, results in (i) end shield member 74 defining an internal space 96 and (ii) a portion 82 of idler wheel 16 being located within internal space 96.

Referring now to FIGS. 4 and 5, nose piece 44 is attached to first half 104 and second half 106 of end shield member 74 with a number of fasteners so that (i) first half 104 is interposed between nose piece 44 and protection member 30 and (ii) second half 106 is interposed between nose piece 44 and protection member 40.

As shown more clearly in FIG. 5, a thrust plate 88 is secured to a hub 86 on each side of idler wheel 16 so that thrust plate 88 is interposed between hub 86 and end shield member 74. Thrust plate 88 functions as a bearing surface for end shield member 74 since end shield member 74 will periodically be urged toward hub 86 during use of tractor 8.

Industrial Applicability

During use of tractor 8, apparatus 18 substantially prevents plant matter, such as leaves, or other material in the vicinity of track assembly 10 becoming trapped in the "pinch points" between (i) drive wheel 14 and endless track 22, (ii) mid-rollers 20 and endless track 22, and (iii) ground 102 and endless track 22. In particular, having guard members 42 located so that a portion 92 of drive wheel 14 is positioned behind a guard member 42 substantially prevents plant or other material from being trapped in the pinch point between drive wheel 14 and endless track 22. Moreover, having guard members 42 located so that a portion 90 of each mid-roller 20 is positioned behind a guard member 42 substantially prevents plant or other material from being trapped in the pinch point between each mid-roller 20 and endless track 22. In addition, having guard member 42 located so that a segment 138 of idler wheel 16 is positioned behind guard member 42 substantially prevents plant or other material from being trapped between idler wheel 16 and endless track 22.

Furthermore it should be appreciated that having guard members 42 spaced apart from each other so as to define gaps 70 therebetween allows any material that does become trapped in track assembly 10 to escape. In other words, gaps 70 provide an escape route for material that becomes trapped in track assembly 10 during use of tractor 8. This is in contrast to other track assemblies which have a protection apparatus that does not provide an escape route (i.e. gaps 70) for trapped material. In particular, material that becomes trapped in these types of track assemblies tends to accumulate therein and thus cause maintenance problems as described above.

It should also be appreciated that having guard members 42 constructed from a resilient material is an advantage of the present invention. In particular, having guard members 42 constructed from a resilient material allows guard members 42 to bend or flex when endless track 22 is urged into contact with one or more guard members 42. For example, during the use of tractor 8, endless track 22 may be driven over an obstacle, such as a rock, which urges endless track 22 upwardly into contact with a guard member 42. However, since each guard member 42 is made from a resilient material, the guard member 42 that comes into contact with endless track 22 will simply flex or bend to accommodate the upward movement of endless track 22. Once the upwardly urging force is removed from endless track 22 and the guard member 42 is again spaced apart from endless track 22, the guard member 42 will quickly spring back into its original shape, i.e. the shape guard member 42 possessed before coming into contact with endless track 22. Thus it should be appreciated that having guard members made from a resilient material eliminates the need for relatively complex mechanical mechanisms which cooperate with a protection member such that the protection member can accommodate the above described upward movement of an endless track.

End shield member 74 enhances the ability of apparatus 18 to substantially prevent material from being trapped within track assembly 10. In addition, as described above end shield member 74 can pivot relative to protection members 30 and 40 in the directions indicated by arrows 78 and 80. Therefore, end shield member 74 is able to move or pivot when striking an obstacle, such as a rock. Being able to move or pivot in the above described manner prevents the obstacle from damaging end shield member 74 during use of tractor 8. However, it should be understood that end shield member 74 can be made from a resilient material such that when end shield member 74 strikes an obstacle it simply bends or flexes to accommodate the striking force. Thus, it should be understood that when end shield member 74 is made from a resilient material in the above described manner it does not have to be pivotally secured to protection members 30 and 40 but rather can be fixed in relation thereto.

Deflector plates 98 function to prevent material from falling into the space interposed between protection member 30 and protection member 40. In particular, deflector plates 98 prevent material adhered to the portion of endless track 22 positioned vertically above apparatus 18 from falling into the space interposed between protection member 30 and protection member 40.

Furthermore it should be appreciated that assembly 18 can be easily adjusted to accommodate track assemblies having different widths. For example, apparatus 18 can be widened to accommodate a wider track assembly by interposing spacers (not shown) between (i) attachment plates 45 and 56 and protection member 30 and (ii) attachment plates 58 and 60 and protection member 40 so as to increase the lateral distance between protection members 30 and 40. In addition, fasteners 130 (see FIG. 5) securing nose piece 44 to end shield member 74 are inserted through elongated slots 132 (see FIG. 5) formed in end shield member 74. Therefore, fasteners 130 can be loosened such that first half 104 and second half 106 of end shield member 74 can be moved away from each other thereby increasing the lateral distance therebetween. Once first half 104 and second half 106 of end shield member 74 are moved further apart, fasteners 130 are retighten so that end shield member 74 can function as described above.

While the invention has been illustrated and described in detail in the drawings and foregoing description, such illustration and description is to be considered as exemplary and not restrictive in character, it being understood that only the preferred embodiment has been shown and described and that all changes and modifications that come within the spirit of the invention are desired to be protected.

What is claimed is:

1. An apparatus for protecting a track assembly of a tractor, wherein said track assembly includes a frame, an idler wheel mechanically coupled to said frame, a drive wheel mechanically coupled to said frame, an endless track disposed around said idler wheel and said drive wheel, and a number of mid-rollers interposed between said idler wheel and said drive wheel, comprising:

a first protection member having a first upper edge and a first lower edge, said first protection member being securable adjacent to one of an outer side and an inner side of a portion of said frame;

a number of first guard members secured to said first protection member so that said first guard members extend downwardly beyond said first lower edge toward said endless track and said first guard members are spaced apart from each other along said first lower edge such that a gap is defined between adjacent first guard members;

a second protection member having a second upper edge and a second lower edge, said second protection member being securable to said frame such that a portion of said frame is interposed between said first protection member and said second protection member;

a number of second guard members secured to said second protection member so that said second guard members extend downwardly beyond said second lower edge toward said endless track and said second guard members are spaced apart from each other along said second lower edge such that a gap is defined between said adjacent second guard members; and an end shield member pivotally secured to said first protection member so that said end shield member can pivot relative to said first protection member in a first direction and a second direction and when said end shield member is pivotally coupled to said first protection member, and covers a portion of said idler wheel.

2. The apparatus of claim 1, further comprising:

a nose piece attached to said end shield member so that said end shield member is interposed between said nose piece and said first protection member.

3. The apparatus of claim 1, further comprising:

a deflector plate attached to said upper edge of said first protection member.

4. The apparatus of claim 1, wherein said idler wheel includes a hub, further comprising:

a thrust plate secured to said hub of said idler wheel so that said thrust plate is interposed between said end shield member and said hub.

5. The apparatus of claim 1, wherein:

said first guard members are made from a resilient substance.

6. The apparatus of claim 1, wherein:

said first guard members are positioned adjacent to and covers a portion of said mid-rollers.

7. The apparatus of claim 6, wherein:

a first guard member is positioned adjacent to and covers a portion of said drive wheel.

8. An apparatus for protecting a track assembly of a tractor, wherein said track assembly includes a frame, an idler wheel mechanically coupled to said frame, a drive wheel mechanically coupled to said frame, an endless track disposed around said idler wheel and said drive wheel, and a number of mid-rollers interposed between said idler wheel and said drive wheel, comprising:

a first protection member having a first upper edge and a first lower edge, said first protection member being securable adjacent to one of an outer side and an inner side of a portion of said frame;

a number of first guard members secured to said first protection member so that said first guard members extend downwardly beyond said lower edge toward said endless track and said first guard members are spaced apart from each other along said first lower edge such that a gap is defined between adjacent first guard members;

a second protection member having a second upper edge and a second lower edge, said second protection member being securable to said frame such that a portion of said frame is interposed between said first protection member and said second protection member;

a number of second guard members secured to said second protection member so that said second guard members extend downwardly beyond said second lower edge toward said endless track and said second guard members are spaced apart from each other along said second lower edge such that a gap is defined between adjacent second guard members; and an end shield member secured to said first protection member and said second protection member so that when said end shield member is secured to said first and second protection members a portion of said idler wheel is located within an internal space defined by said end shield member.

9. The apparatus of claim 8, wherein:

said end shield member is pivotally secured to said first and second protection members so that said end shield member can pivot relative to said first and second protection members in a first direction and a second direction.

10. The apparatus of claim 8, wherein:

a guard member is secured to said end shield member so that said guard member covers a segment of said idler wheel.

11. The apparatus of claim 8, wherein:

said first guard members and said second guard members are positioned adjacent to each of said mid-rollers so that a portion of each mid-roller is interposed between said adjacent first and second guard members.

12. The apparatus of claim 11, wherein:

a first guard member and a second guard member are positioned adjacent to said drive wheel so that a portion of said drive wheel is interposed between said adjacent first guard member and said adjacent second guard member.

13. A tractor, comprising:

a track assembly which includes a frame, an idler wheel mechanically coupled to said frame, a drive wheel mechanically coupled to said frame, an endless track disposed around said idler wheel and said drive wheel, and a number of mid-rollers interposed between said idler wheel and said drive wheel;

a first protection member having a first upper edge and a first lower edge, said first protection member being secured adjacent to one of an outer side and an inner side of a portion of said frame; and a number of first guard members secured to said first protection member so that said first guard members extend downwardly beyond said first lower edge toward said endless track and said first guard members are spaced apart from each other along said first lower edge such that a gap is defined between adjacent first guard members;

a second protection member having a second upper edge and a second lower edge, said second protection member being secured to said frame such that a portion of said frame is interposed between said first protection member and said second protection member;

a number of second guard members secured to said second protection member so that said second guard members extend downwardly beyond said second lower edge toward said endless track and said second guard members are spaced apart from each other along said second lower edge such that a gap is defined between said adjacent second guard members;

an end shield member secured to said first protection member and said second protection member so that when said end shield member is secured to said first and second protection members a portion of said idler wheel is located within an internal space defined by said end shield member.

14. The tractor of claim 13, wherein:

said first guard members include a plurality of bristles.

15. The tractor of claim 13, wherein:

at least one of said first guard members is positioned adjacent to one of said mid-rollers so that a portion of said mid-roller is covered by said guard member, and at least one of said first guard members is positioned adjacent to said drive wheel so that a portion of said drive wheel is covered by said guard member.

* * * * *